United States Patent [19]

Dixon et al.

[11] 4,198,462

[45] Apr. 15, 1980

[54] PROCESSES FOR PREPARING TEXTILE FINISHING COMPOSITION AND FINISHING TEXTILE MATERIALS THEREWITH

[75] Inventors: Carole M. Dixon; Edward B. Lawler, both of Charlotte, N.C.

[73] Assignee: American Cyanamid Company, Stamford, Conn.

[21] Appl. No.: 930,465

[22] Filed: Aug. 2, 1978

[51] Int. Cl.² .......................... B05D 3/02; B32B 27/00
[52] U.S. Cl. ................................. 428/290; 427/393.2; 427/392; 428/526; 528/245
[58] Field of Search ...................... 427/390 C, 392; 528/245; 428/290, 526

[56] References Cited

U.S. PATENT DOCUMENTS

| | | | |
|---|---|---|---|
| 3,312,521 | 4/1967 | Stenner | 427/390 X |
| 3,764,263 | 10/1973 | Powanda et al. | 427/390 X |
| 3,765,836 | 10/1973 | Readshaw et al. | 427/390 X |
| 4,016,335 | 4/1977 | Chao | 427/390 X |
| 4,072,466 | 2/1978 | Hermann | 427/390 X |

Primary Examiner—Michael R. Lusignan
Attorney, Agent, or Firm—H. G. Jackson

[57] ABSTRACT

The invention is a process for manufacturing low free-formaldehyde crease-proofing compositions for textiles and a process for treating the textile materials therewith.

14 Claims, No Drawings

PROCESSES FOR PREPARING TEXTILE FINISHING COMPOSITION AND FINISHING TEXTILE MATERIALS THEREWITH

The presence of free formaldehyde in a textile finishing composition and on textile materials finished therewith is undesirable because of the noxious odors which are produced on heating textile materials treated therewith, and released in storage and in subsequent cutting operations. Very often attempts to physically reduce the free formaldehyde concentration in the textile finishing composition impairs the solubility of the resin in water.

There is a need therefore for a textile finishing composition having a low free formaldehyde content which imparts desirable physical properties to textile materials, such as durable press appearance, abrasion resistance, wrinkle recovery, and the like, without releasing high levels of formaldehyde on heating, or in storage and subsequent cutting operations.

The invention is a process for preparing compositions for providing durable crease resistance to cellulosic textile materials, containing about 1.5%, or less, by weight of free formaldehyde, comprising reacting in a first stage an aqueous solution containing about one molar proportion of urea and about 4 to 6 molar proportions of formaldehyde at a pH of about 9.5 to 10.5 and a temperature of about 60° to 80° C. until the free formaldehyde content of the reaction mixture is reduced to about 0.1 to 1.9 moles per mole of urea charged, and adjusting the pH to about 6.0 to 6.8; and in a second stage, adding glyoxal containing formaldehyde and additional urea in an amount to provide a total molar ratio of urea to formaldehyde to glyoxal of about 1:2.8 to 3.5:0.18 to 0.55; adjusting the reaction mixture to a pH of about 6.0 to 6.6 and heating the same at a temperature of about 55° to 65° C., while maintaining the pH at about 6.0 to 6.6 until the free formaldehyde content is reduced to about 2.0%, or less, by weight; cooling the reaction mixture to below 40° C., adjusting the pH to about 5.0 to 6.0, and diluting the reaction mixture with water to a solids content of about 30 to 50% by weight.

The invention also pertains to a textile finishing composition obtained by the process described above, to a process for treating cellulosic textile materials with the textile finishing composition and to the finished textile material obtained by said finishing process.

Petersen et al's U.S. Pat. No. 3,801,546 teaches a process for preparing stable liquid textile finishing agents for cellulosic textile material. Dundon's U.S. Pat. No. 3,335,113 teaches the preparation of substantially fully methylolated urea resins having free formaldehyde content of about 3 to 4% by weight.

The processes of the invention provide the following advantages over the art.

1. The formaldehyde released by the treated textile material in storage and in subsequent cutting operations is reduced.

2. The free formaldehyde in the textile finishing composition is substantially reduced.

3. The formaldehyde released upon drying and curing the treated textile material is substantially reduced.

In the first stage of the process of the invention urea is reacted in an aqueous solution with formaldehyde at a molar ratio of urea to formaldehyde of about 1:4–6, at a pH of about 9.5 to 10.5, preferably about 9.6 to 9.9, and at a temperature of about 60° to 80° C., preferably about 65° to 75° C. The pH is maintained between 9.5 and 10.5 by the periodic addition of an alkalizing agent, preferably 25% aqueous caustic soda free formaldehyde content is 13.0%, or less.

In place of urea it is possible to use an aqueous solution containing tetramethylolurea, or trimethylolurea and formaldehyde, as starting material. In such a case, the first stage of the process has already been performed and the material may be used as starting material for the second stage. Such highly methylolated ureas are described by Dundon in U.S. Pat. No. 3,335,113.

After the free formaldehyde content has been reduced to the desired level, the reaction mixture is cooled to about 30° to 45° C., preferably about 35° to 40° C., and acidified to a pH of about 6.0 to 6.6, preferably about 6.4 to 6.6.

Suitable acids which may be used to adjust the pH to 6.0 to 6.6 include inorganic acids such as nitric, sulfuric, hydrochloric, phosphoric, and the like. Relatively strong organic acids such as oxalic, formic, and the like, may also be used. The preferred acid is nitric.

The reaction in the second stage is then carried out by adding glyoxal, additional urea and formaldehyde, in amounts sufficient to give a total mole ratio of urea to formaldehyde to glyoxal of about 1:2.8 to 3.5:0.18 to 0.55, preferably about 1:2.8 to 3.1:0.30 to 0.52. By total mole ratio is meant the ratio of the total amounts of each component added, irrespective of their manner of combination in the reaction mixture. Preferably, the glyoxal and additional formaldehyde are added as a 40% aqueous glyoxal solution containing about 7% formaldehyde. The reaction of the second stage is carried out at a pH of about 6.0 to 6.6, preferably about 6.4 to 6.6, and at a temperature of about 55° to 65° C., preferably about 59° to 61° C., while maintaining the pH between 6.0 and 6.6 by the addition of an acid or alkalizing agent as required, until the free formaldehyde content is less than 2%, preferably less than 1%. The reaction mixture is then cooled below 40° C., preferably to about 30° to 35° C., adjusted to about pH 5.0 to 6.0, preferably about 5.0 to 5.5, and diluted with water to about 30 to 50% solids, preferably about 44 to 46% solids. Preferably, after dilution the reaction mixture is clarified by filtration. The solution of textile finishing agent prepared in this manner has excellent storage stability.

The textile finishing compositions of the invention may be used to impart durable press properties to cellulosic textile fabrics by padding, dipping, immersing, spraying, and the like, together with a suitable amount of a catalyst to effect crosslinking and a suitable surfactant to facilitate wetting the textile material. Suitable catalysts include magnesium chloride, zinc chloride, zinc nitrate, aluminum chloride, and the like, and mixtures thereof. Suitable surfactants include nonionic surfactants such as ethylene oxide adducts of straight chain alcohols, alkyl aryl polyethyleneglycol ethers, condensation products of ethylene oxide and nonylphenol, and the like. Suitable cellulosic textile materials include fibers, yarns, filaments, formed fabric, whether woven or non-woven, felted or otherwise formed, containing at least 20% by weight of cellulose fiber prepared from cotton, rayon, linen, flax, and the like. These cellulosic textile materials include blends with other natural or synthetic fibers, as for example wool, nylon, acrylic and polyester fibers, and the like. The preferred cellulosic textile material is a 65% polyester/35% cotton blend.

A pad bath is prepared containing about 2.5 to 13.5% by weight, preferably about 3.75 to 8.1% by weight, of real solids of finishing agent, about 0.1% by weight of a condensation product of one mole of nonylphenol and about 9.5 moles of ethylene oxide, about 0.3 to 1.6% by weight, preferably about 0.5 to 1.0% by weight, of anhydrous magnesium chloride, and about 0.03 to 0.2% by weight, preferably about 0.06 to 1.2% by weight, of anhydrous aluminum chloride. The textile material is immersed in the pad bath, the excess liquor is removed by passing the impregnated material between squeeze rolls and the treated material is squeezed to deposit thereon about 2 to 10% by weight, preferably about 3 to 6% by weight, real solids of finishing agent based on the weight of the untreated material. The treated material is then dried, or substantially dried, and cured at about 160° to 190° C. for a period of about 45 to 150 seconds, preferably at about 175° to 190° C. for a period of 50 to 90 seconds. The cellulosic textile materials finished in this manner have excellent durable press appearance, durable wrinkle resistance and good abrasion resistance. The textile materials obtained by the process of this invention are particularly characterized by the low level of formaldehyde emitted after the drying, or substantially drying, operation prior to the curing step. This is particularly important in processes which involve post-cure durable press processing. Optionally, the compositions of this invention may be used in conjunction with other textile finishing agents and auxiliaries such as water-repellents, softeners, brighteners, odorants, and the like.

In the examples which follow all parts and percentages are by weight unless otherwise stated.

EXAMPLE 1

Aqueous formaldehyde, 44% (3540 grams; 51.87 moles), is heated to 29.5° C. and 40% aqueous glyoxal (3740 grams; 25.8 moles) is added thereto while stirring and maintaining the temperature at 29.5° C. The resulting mixture is then adjusted to a pH of 6.0–6.2 by slowly adding a 6.8% aqueous solution of sodium bicarbonate thereto.

Urea (1560 grams; 25.9 moles) is added to the solution while maintaining the resulting reaction mixture at 29.5° C. The reaction mixture is then heated to 60° C. and maintained thereat, while adding 6.8% aqueous sodium bicarbonate solution, as necessary, to maintain the pH at 6.4–6.6, until the free formaldehyde content of the reaction mixture falls below 1.5%. The reaction mixture is then cooled to 35° C., diluted with water (1500 grams), and adjusted to a pH of 5.8–6.2 by adding citric acid (386 grams) and 50% aqueous caustic soda (450 grams) thereto. The reaction mixture is diluted with water to a solids content of 45%, and clarified by filtration. The free formaldehyde content of the clarified solution is 1.5%.

The above example illustrates the preparation of a prior art material, a solution of 1,3-bis(hydroxymethyl)-4,5-dihydroxy-2-imidazolidinone, which is a component of the compositions of the invention.

EXAMPLE 2

Aqueous formaldehyde, 50% (2720 grams; 45.3 moles), is adjusted to pH 7 by adding 25% caustic soda thereto. The solution is then diluted with water (370 grams) and adjusted to pH 9.9 by adding 25% caustic soda (33.8 grams).

Urea (680 grams; 11.31 moles) is added to the formaldehyde solution and the reaction mixture is heated to 68°–72° C. and held thereat for 20 minutes. Additional 25% caustic soda (33.8 grams) is added to adjust the pH to 10.4 and the temperature is held at 68°–72° C. for an additional 110 minutes, while periodically adding 25% caustic soda to maintain the pH at 10.4. The reaction mixture is then cooled to 40° C., adjusted to a pH of 6.2 with concentrated nitric acid, and clarified by filtration. The clarified solution has a solids content of 48%, and a free formaldehyde content of 3.3%, which represents 0.4 mole of free formaldehyde per mole of urea charged.

The above example illustrated the preparation of a prior art highly methylolated urea resin, having a relatively high free formaldehyde content, obtained by carrying out the first stage of the invention.

The following examples illustrate the processes and compositions of the invention:

EXAMPLE 3

The product of Example 2 (800 grams), containing 26.4 grams (0.88 mole) of free formaldehyde, is mixed at ambient temperature with 40% aqueous glyoxal (75 grams; 0.52 mole), containing 7% formaldehyde (0.18 mole), and the pH is adjusted to 6.2 by adding a 7.5% aqueous sodium bicarbonate solution thereto.

Urea (31.1 grams; 0.52 mole) is added to the solution and the resulting reaction mixture is heated to 59°–61° C. and maintained thereat for 3 hours, while periodically adding the 7.5% sodium bicarbonate solution to maintain the pH at 6.4–6.6. At this point the free formaldehyde content of the reaction mixture is about 1.8%. The reaction mixture is then cooled to 35° C. and the pH is adjusted to 5.5 with nitric acid. The reaction mixture is then diluted with water to a solids content of 45%, and clarified by filtration. The free formaldehyde content of the clarified solution is 1.5%; the total molar ratio of urea to formaldehyde to glyoxal is 1:3.34:0.18 in the final product.

EXAMPLE 4

The procedure of Example 3 is followed in every detail except that after initially adjusting the pH to 6.2 the reactants utilized are 150 grams (1.03 moles) of 40% aqueous glyoxal, containing 10.51 grams (0.35 mole) of formaldehyde, and 62.1 grams (1.03 moles) of urea. After heating at 59°–61° C. for 3 hours, the free formaldehyde content of the reaction mixture is 0.75%. The free formaldehyde content of the diluted, clarified solution is 0.7%; the total molar ratio of urea to formaldehyde to glyoxal is 1:2.88:0.31 in the final product.

EXAMPLE 5

Aqueous formaldehyde, 50% (4379 grams; 72.9 moles), is treated with 25% caustic soda to adjust the pH to 7–8. The resulting solution is then mixed with additional 25% caustic soda (51 grams) and heated to 68°–72° C.

Urea (731 grams; 12.2 moles) is added to the solution and the reaction mixture is stirred at 68°–72° C. for 20 minutes after the addition of the urea is completed. Additional 25% caustic soda (51 grams) is then added to adjust the pH to about 9.5–10.0, and the reaction mixture is stirred at 68°–72° C. for another 20 minutes. An additional 51 grams of 25% caustic soda is added and the reaction mixture is heated at 68°–72° C., while maintaining the pH at 9.5–10.0 by the addition of 25% caustic soda, until the free formaldehyde content is equal to, or less than, 12.5%. This requires about 90 minutes and the addition of about 27 grams of 25% caustic soda. The reaction mixture is then cooled to 40° C. and the pH is adjusted to 6.6 with concentrated nitric acid.

Aqueous glyoxal, 40% (1882 grams; 13.0 moles), containing 7% formaldehyde (131.53 grams; 4.38 moles), is added to the reaction mixture and the pH is adjusted to 6.2-6.4 by adding a 7.5% aqueous sodium bicarbonate solution thereto.

Urea (779 grams; 13.0 moles) is added and the reaction mixture is heated at 59°-61° C., while maintaining the pH at 6.2 to 6.4 by adding additional sodium bicarbonate solution as necessary, until the free formaldehyde content reaches 0.8%. This requires about 2½ to 3 hours and about 17 grams of sodium bicarbonate solution. The reaction mixture is then cooled to 35° C. and the pH is adjusted to 5.2 with concentrated nitric acid. The reaction mixture is then diluted with water to a solids content of 45% and clarified by filtration. The clarified solution has a free formaldehyde content of 1.1%; the molar ratio of urea to formaldehyde to glyoxal is 1:3.07:0.52.

EXAMPLE 6

Aqueous pad baths having pH values of 4.2-4.5, containing 6.75 by weight real solids of the products of Examples 1-4, respectively, 0.82% by weight of magnesium chloride, 0.08% by weight of aluminum chloride, and 0.1% by weight of a non-ionic surfactant (DECERESOL® Surfactant NI Conc.; American Cyanamid Company) are prepared and applied by standard padding procedure to 65% polyester/35% cotton shirting (2.5 ounces per sq. yard) to deposit about 5.0% real solids on the fabric. The resulting fabric is dried and cured for 48 seconds at 190°-191° C. and process washed by padding (2 dips and 2 nips) through running water. The washed fabric is then dried at 106°-107° C. and evaluated for durable press appearance and abrasion resistance using AATCC124-1975 and ASTM D1175-64T, respectively.

The results obtained are shown in Table I in which Fabrics A-D correspond to treatments with the products of ples 1-4, respectively.

TABLE I

| Fabric | Durable Press Appearance | | Accelerator Abrasion % Weight Loss | | |
|---|---|---|---|---|---|
| | 1 Wash | 5 Washes | Trial 1 | Trial 2 | Average |
| A | 3.75 | 3.90 | 4.9 | 4.8 | 4.85 |
| B | 3.50 | 3.50 | 3.3 | 2.9 | 3.1 |
| C | 3.75 | 3.50 | 3.1 | 3.4 | 3.25 |
| D | 3.50 | 3.60 | 3.4 | 3.1 | 3.25 |
| Untreated | 2.10 | 2.10 | 0.29 | 0.53 | 0.4 |

EXAMPLE 7

The procedure of Example 6 is used except that the fabric is bleached, mercerized cotton broadcloth (3.2 ounces per sq. yd.) and 5.37% by weight real solids is deposited on each fabric. After process washing and drying, each fabric is tested for initial tensile strength, wrinkle recovery, and abrasion resistance.

The results obtained are shown in Table II.

TABLE II

| Fabric | Tensile Initial Fill (lbs.) | Degrees[a] Wrinkle Recovery Total | | Accelerator Abrasion % Weight Loss | | |
|---|---|---|---|---|---|---|
| | | Initial | 5 Washes | Trial 1 | Trial 2 | Average |
| A | 18 | 292 | 269 | 15.5 | 14.9 | 15.2 |
| B | 16 | 288 | 262 | 10.9 | 10.1 | 10.5 |
| C | 16 | 284 | 266 | 13.2 | 12.2 | 12.7 |
| D | 15 | 283 | 268 | 12.9 | 11.2 | 12.1 |
| Untreated | 35 | 190 | 177 | 1.5 | 1.4 | 1.45 |

[a]AATCC 66-1975

EXAMPLE 8

Aqueous pad baths are prepared and applied to 65% polyester/35% cotton, as described in Example 6, utilizing the products of Examples 1, 2, and 5, 1% magnesium chloride, 0.09% aluminum chloride, and 0.1% of the nonionic surfactant. After drying, curing, process washing and drying, as described in Example 6, the treated fabrics A, B, and C, respectively, are evaluated for formaldehyde release using the procedure of AATCC112-1975. The results obtained are listed in Table III in parts per million of formaldehyde released on the weight of fabric specimen.

TABLE III

| Fabric | Formaldehyde Released | | |
|---|---|---|---|
| | Trial 1 | Trial 2 | Average |
| A | 599 | 623 | 611 |
| B | 1497 | 1595 | 1546 |
| C | 897 | 986 | 941 |

The results in Table III show that the fabric treated with the 1,3-bis(hydroxymethyl)-4,5-dihydroxy-2-imidazolidinone (fabric A) gives the lowest release of formaldehyde. The results also show that the fabric treated with the composition of the invention (fabric C) releases only about 61% of the formaldehyde released by the fabric treated with the highly methylolated urea (fabric B).

EXAMPLE 9

The procedure of Example 6 is followed to compare the prior art material of Example 1 and the composition of Example 5 on an equal cost basis on 65% polyester/35% cotton fabric. In order to do this aqueous pad baths are prepared having the following compositions:

| | % by Weight | |
|---|---|---|
| | 1 | 2 |
| Product of Example 1 | 15.0 | — |
| Product of Example 5 | — | 16.4 |
| Magnesium chloride | 0.82 | 0.90 |
| Aluminum chloride | 0.08 | 0.09 |
| Nonionic surfactant | 0.10 | 0.10 |
| Bath pH | 4.4 | 4.0 |

The fabric is immersed in the pad bath and passed through squeeze rolls to obtain a wet pickup of 74% based on the weight of the untreated fabric. The treated fabric is then dried, cured, process washed and evaluated for durable press appearance and abrasion resistance as described in Example 6.

The results obtained are shown in Table IV in which fabrics A and B correspond to treatments with the products of Examples 1 and 5, respectively.

TABLE IV

| Fabric | Durable Press Appearance | | Accelerator Abrasion % Weight Loss | | |
|---|---|---|---|---|---|
| | 1 Wash | 5 Washes | Trial 1 | Trial 2 | Average |
| A | 3.60 | 3.40 | 8.2 | 9.6 | 8.9 |
| B | 3.70 | 3.60 | 7.1 | 8.5 | 7.8 |
| Untreated | 2.10 | 2.50 | 0.8 | 0.7 | 0.8 |

TABLE V

| Fabric | Tensile Strength Fill (lbs.) | Wrinkle Recovery Total | | Accelerator Abrasion % Weight Loss | | |
|---|---|---|---|---|---|---|
| | | Initial | 5 Washes | Trial 1 | Trial 2 | Average |
| A | 21 | 267 | 258 | 11.6 | 12.1 | 11.9 |
| B | 20 | 278 | 272 | 9.6 | 10.2 | 9.9 |
| Untreated | 39 | 182 | 185 | 1.9 | 2.2 | 2.1 |

We claim:

1. A process for finishing cellulosic textile materials comprising impregnating the materials with an aqueous solution containing a suitable catalyst and a textile finishing composition prepared by reacting in a first stage an aqueous solution containing about one molar proportion of urea and about 4 to 6 molar proportions of formaldehyde at a pH of 9.5 to 10.5 and a temperature of about 60° to 80° C. until the free formaldehyde content of the reaction mixture is reduced to about 0.1 to 1.9 moles per mole of urea charged, and adjusting the pH to about 6.0 to 6.8; and in a second stage, adding glyoxal containing formaldehyde and additional urea in an amount to provide a total molar ratio of urea to formaldehyde to glyoxal of about 1:2.8 to 3.5:0.18 to 0.55; adjusting the reaction mixture to a pH of about 6.0 to 6.6 and heating the same at a temperature of about 55° to 65° C., while maintaining the pH at about 6.0 to 6.6 until the free formaldehyde content is reduced to less than 2% by weight; cooling the reaction mixture to below 40° C., adjusting the pH to about 5.0 to 6.0, and diluting the reaction mixture with water to a solids content of about 30 to 50% by weight, and drying and curing the impregnated material at a temperature of about 160° to 190° C. for a period of about 45 to 150 seconds to deposit 2 to 10% solids thereon, based on the weight of untreated textile materials.

2. A process according to claim 1 wherein the mole ratio of urea to formaldehyde in the first stage is 1:4, the amounts of glyoxal, formaldehyde and urea added in the second step is sufficient to provide a total molar ratio of urea to formaldehyde to glyoxal of 1:2.8 to 3.1:0.30 to 0.52, and the reaction mixture is heated until the free formaldehyde content is 0.8% or less.

3. The process according to claim 2 wherein the total molar ratio of urea to formaldehyde to glyoxal is 1:2.9:0.31 and the reaction mixture is heated until the free formaldehyde content is 0.75% or less.

4. The process according to claim 2 wherein the total molar ratio of urea to formaldehyde to glyoxal is 1:3.1:0.52 and the reaction mixture is heated until the free formaldehyde content is 0.80% or less.

5. The process of claim 2 wherein the cellulosic textile material is 65% polyester/35% cotton.

6. The process of claim 3 wherein the cellulosic textile material is 65% polyester/35% cotton.

7. The process of claim 4 wherein the cellulosic textile material is 65% polyester/35% cotton.

8. The finished cellulosic textile material of claim 1.
9. The finished cellulosic textile material of claim 2.
10. The finished cellulosic textile material of claim 3.
11. The finished cellulosic textile material of claim 4.
12. The finished cellulosic textile material of claim 5.
13. The finished cellulosic textile material of claim 6.
14. The finished cellulosic textile material of claim 7.